Fig. 3.

Patented July 14, 1936

2,047,343

UNITED STATES PATENT OFFICE 2,047,343

REVERSE POWER AND DIFFERENTIAL PROTECTION MEANS

Robert I. Ward, Chicago, Ill.

Application November 9, 1931, Serial No. 573,754

10 Claims. (Cl. 175—294)

This invention relates to means for detecting and protecting against certain types of faults to which alternating current systems are subject, such as short circuits, grounds, or other faults which produce unbalanced conditions in a three phase line, abnormal conditions which result in reverse power flow, etc.

For reverse power protection the present alternating current distribution systems require apparatus that must be directional at one per cent normal voltage and operate in 0.2 second on a reversal of power where the line current is equal to 1500 per cent load. There is considerable difficulty in making such sensitive apparatus and maintaining it at the required sensitivity.

I have devised a relay arrangement wherein the sensitive element comprises a directional power control tube, providing a degree of sensitivity combined with reliability hitherto unknown. This arrangement may be easily made directional at one-half of one per cent normal voltage and operate in 0.05 seconds on a reversal of power of 1500 per cent load. I prefer to connect the grid and the plate circuits in such a manner that the grid prevents any substantial current flow in the plate circuit when the phase angle between the line current and line voltage is such as to indicate a power flow in one direction and to permit plate current to flow when the phase angle has changed upon a change in the direction of power flow.

It is one of the objects of the present invention to provide a directional relay in the form of a three element vacuum tube wherein a certain alternating voltage is applied to the grid, a certain alternating voltage is applied to the plate, and the plate circuit serves as an indication of variations in the relative phase angle between the plate and the grid voltage. The two applied voltages may be functions of the line voltage and current, whereby the relay indicates the direction of power flow, or the two voltages may be functions of the currents flowing in different parts of the system whereby the relay may be used for differential line protection, or for protection against such faults as result in a relative phase change of the currents or voltages in different parts of the system.

It is possible to use a hot cathode tube of the mercury vapor type. The cathode is provided with a heating element which is electrically independent of the operating circuit. I prefer to provide a construction wherein a relatively long period of time, say about five minutes, is necessary for the heating element to bring the cathode to its operating temperatures. This lag in heating time is beneficial in that there is a corresponding lag in cooling time which will permit operation of the tube for a short period of time if the heating circuit is open and will permit the use of a switch or other throw over device to connect the heater to a different source of power in the event that its original power source should fail. A mercury vapor tube also permits the use of a relay in the grid circuit for indicating the life of the tube. As long as current flows in the grid circuit the relay remains energized. When the current flow becomes insufficient to maintain the relay operated, the relay drops back and thus actuates an alarm. This condition is brought about by deterioration of the tube resulting in a diminution of the electron flow from the hot cathode to the grid.

Instead of using a mercury vapor tube, I may use a high vacuum tube. In this type of tube there is no substantial grid current flow and a different form of tube life indicator must be used. This may take the form of an additional element maintained at a positive potential with respect to the cathode. Normally a slight current flows in the circuit including the additional element. When the tube deteriorates and the electron flow to this fourth element is sufficiently reduced, the decreased current is insufficient to maintain an alarm relay energized and it drops back to give a signal of the deterioration of the tube. This fourth element may be arranged mechanically in any suitable manner. One arrangement is that of the ordinary screen grid in a radio vacuum tube.

The attainment of the above and further objects of the present invention will be apparent from the following specification taken in conjunction with the accompanying drawings forming a part thereof.

Figure 1:
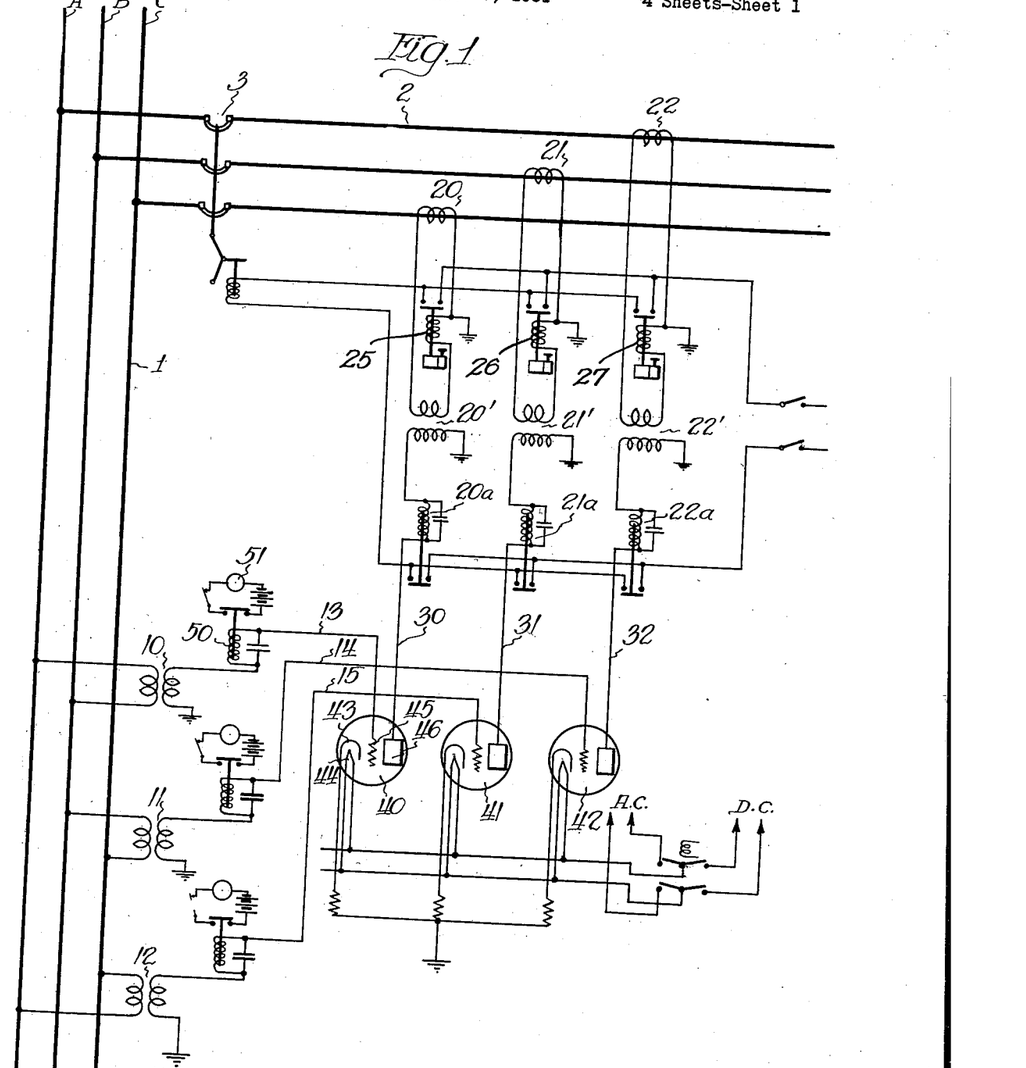
Figure 1 is a simplified circuit diagram showing the application of my invention to a power line for affording protection against reverse power flow.

Reference may now be had more particularly to the circuit shown in Figure 1. A three phase alternating current power line is indicated at 1 and supplies current to a branch 2 through the usual switching arrangement indicated in the present instance by a circuit breaker 3. The three phases of the power line are indicated at A, B, and C. Power normally flows from the line 1 to the line 2, but under abnormal conditions there may be a reversal of power flow so that power tends to flow from the line 2 to the line 1. This condition may be rendered possible by the fact that the line 2 is connected as a part of a net work including power sources or power lines in addition to the line 1. The relay arrangement shown in Figure 1 is provided for the purpose of tripping the circuit breaker 3 upon the occurrence of a flow of power from the line 2 to the line 1.

Since the direction of flow of power in an alternating current system is a function of the phase relationship between the current and the voltage, the means provided for detecting a reversal in the direction of power flow must give some indication of the change in the phase angle. I provide three voltage transformers indicated at 10, 11, and 12, the primaries of which are connected across the three phase conductors, and the secondaries of which are connected to my reverse power indicating means. The transformers 10, 11, and 12 step the line voltages down to suitable values and the voltages between ground and the conductors 13, 14, and 15 will be functions of the phase to phase voltages of the line 1.

For current transformation I use three current transformers indicated at 20, 21, and 22. Since the design of commercial current transformers now in use is such as to require that the output side of the transformer be maintained substantially short circuited, I provide additional special potential transformers for accomplishing this. The special potential transformers are indicated at 20', 21', and 22' having their primaries connected to the output sides of the respective current transformers through low resistance overload relays 25, 26, and 27. It is desirable to introduce a time delay in the operation of the relays 25, 26, and 27. This may be done in any desired manner as, for instance, by providing the relays with means within the relay for delaying its action, or with external means, mechanical or electrical, for delaying the action. A conventional type of time delay for the relays 25, 26 and 27 is shown for the purpose of illustration only in Figure 1. The secondaries of the three potential transformers 20', 21', and 22' are connected to conductors 30, 31, and 32 through series trip circuit relays 20a, 21a, and 22a. It is apparent that the voltage between ground and the respective conductors 30, 31, and 32 will vary in some relationship to the variations in the current flowing through the corresponding conductors of the line 2.

It is apparent from the description thus far given that the phase relationship of the voltages of the conductors 30, 31, and 32 to the voltages of the conductors, 13, 14, and 15 will vary as the phase relationship between the current and voltage of the line 2 varies. This need not be a straight line relationship since I am in the present instance interested only in detecting such changes in phase relationship as are indicative of changes in direction of power flow. I provide three high vacuum tube relays, indicated at 40, 41, and 42, for responding to the required changes in phase angle.

Each tube is provided with a cathode 43 adapted to be heated by a heater 44 and is provided with a grid element 45 and a plate element 46. The operating characteristics of the three element vacuum tubes 40, 41, and 42 when used on alternating current, are such that when the control grid and plate voltages are in phase both grid and plate current will flow during the positive half cycle, but when the control grid and plate voltages are 180 degrees out of phase only a minimum grid current will flow during alternate half cycles and there will be no plate current flow. The conductors 13, 14, and 15 are connected to the grid elements of the respective tubes whereas the conductors 30, 31 and 32 are connected to the plate elements of the tubes. The polarities of the transformers supplying the gride and plate voltages are so connected that the voltages at the plate and grid of each tube are opposing each other by approximately 180 degrees under normal operating conditions. The circuit for both the grid and plate are completed through the cathode to ground.

To understand the operation of the relay scheme it will be necessary to analyze the operating characteristics of the vacuum tube. The tube used is, as previously stated, a mercury vapor or high vacuum tube which has a low internal impedance and may be designed to permit enough current to pass through it to operate a substantial relay in both the plate and grid circuits. The grid controls the flow of electrons from the cathode to the plate. The electrons flow from negative to positive, and if a grid or obstruction of sufficient dimensions and negative voltage is placed in the path of these electrons, their path would be blocked and consequently the plate circuit would be incomplete. In the case of the high vacuum tube the plate current depends upon the amount and polarity of the grid voltage. This does not hold true with the mercury vapor type tube. In the mercury vapor type tube the grid looses control of the plate current as soon as ionization takes place, and does not regain control until the plate voltage has been reduced practically to zero. When alternating current is used on the plate circuit the grid resumes control each alternation. These tubes are manufactured with both negative and positive grid control characteristics. That is, in a negative grid control tube the tube looses control of the plate at some negative voltage depending upon the design of the tube. In the positive grid control type the grid controls the plate current from negative to some positive value. This type of tube is necessary in the protection scheme above set forth. The type of tube to be used should operate between zero and positive 0.5 volt when the special plate transformer's secondary voltage has reached its maximum. That is, the grid will control the plate current as long as it has a negative voltage and to a positive voltage of one-half volt. In the reverse power line protection this permits selectivity with less than one-half of one per cent line voltage at the bus. This cannot be done with the reverse power relays heretofore used.

Under normal operating conditions the grid and plate voltages are 180 degrees out of phase.

For one-half of the cycle the grid is negative and the plate positive. In this case the grid prevents the plate current from flowing. During the other half of the cycle the grid is positive and the plate is negative. No plate current can flow, but grid current can flow. The grid current may be utilized to maintain a relay 50 in its operated condition, or a separate grid element may be employed, as previously described. In case the tube should fail to function there will be no grid current and the relay 50 will be released thereby completing a circuit for an alarm 51. The relay 50 therefore is an indicator of the operative condition of the tube.

Should there be a reversal of the power flow in the line 2, the phase relationship of the current to the voltage will be reversed. The grid and plate voltages will therefore now be approximately in phase. On one-half of the cycle the grid and plate voltages are negative and no plate current flows. On the other half of the cycle both the plate and the grid are positive and both plate and grid current flows. The plate current brings about the operation of the auxiliary relays 20a, 20b, and 20c which control the completion of a circuit to the tripping coil of the circuit breaker 3. This completes the operation of the tubes as directional power or reverse power relays.

If desired a time element overload relay may be added to the circuit controlling the tripping of the circuit breaker 3. Three such relays are indicated at 25, 26, and 27. These relays are adapted to operate after a time delay upon the occurrence of current flow therethrough in excess of the value for which they have been set. The time delay may be obtained by mechanical or electrical means, as is well known in the art. It is apparent from the circuit arrangement shown that at least one of the three time element overload relays and at least one of the directional relays must be operated in order to complete the circuit for the tripping of the circuit breaker 3.

In the relay arrangement above described there are three important factors to consider. 1. The tube operating characteristics as discussed above. 2. The electrical characteristics of the special plate supply transformers. 3. The changes in the phase angle of the line voltage with respect to the bus voltage on fault conditions.

The special transformer must have certain characteristics to operate satisfactorily in the above system. As its primary is connected in the secondary circuit of the current transformer it has to be designed so that it does not place an unreasonable burden on the current transformer when its plate winding or secondary is open circuited (normal operation). It must supply the necessary plate voltage to actuate the tube when the current transformer has full load current and when the grid and plate are in phase. At heavy overloads the special transformer's secondary voltage must be limited so as not to destroy the operating characteristics of the tubes. Also, its open circuit voltage must be kept at a minimum.

These conditions may be satisfied by designing the transformer so that it operates above the knee of the iron saturation curve when the current in the primary exceeds a given current value, say 5 amperes, for tubes such as are here used. In a system which I have actually built the transformer supplies approximately 100 volts to the plate at 5 amperes, 200 volts at 60 amperes, with an auxiliary relay in the plate circuit of the tube of 2000 ohm impedance. The open circuit voltage was approximately 350 volts at 60 amperes. The iron used was silicon iron. If permalloy or hypernik were used it would probably be possible to decrease the secondary voltage of the transformer at the higher primary current values in proportion to the secondary voltage at smaller primary current values.

The saturation of the iron of the transformer caused considerable distortion of the voltage in the secondary circuit, but due to the characteristics of the tube it did not materially affect the operation of the circuit. Oscillograms of the output characteristics of the transformer showed that the maximum voltage was higher at 5 amperes in the primary than at 30 amperes, but the average voltage was higher at 30 amperes. The wave form was also better at 30 amperes. The secondary voltage was found to lag the primary current by approximately 50 degrees at 5 amperes and 85 degrees at 68 amperes. To compensate for this shift a 90 degree or 120 degree connection would be necessary between the current transformer on the line and the bus potential transformer. That is, supplying the grid from the B-C phase potential and the current for the plate transformer from an A phase source. Whether 90 degrees or 120 degrees is used depends upon the impedance of the auxiliary relay in the tube plate circuit. It was found that by adding impedance in the secondary circuit of the transformers 20', 21', and 22' the angle of lag between the primary current and the secondary voltage increase. Also the change in the line power factor was taken into consideration.

The operating windings of the tube life indicator relays 50 and the windings 20a, 20b, and 20c are shunted by condensers to smooth out the rectified alternating current input through them and to insure positive operation. The directional relays are of the type that close their contacts upon operation whereas the tube life indicating relays 50 are of the type that open their contacts when energized. The purpose of the relays 50 is to operate an alarm or signal to notify the operator of the station that the tube is approaching the end of its active life. This setting is predetermined by the tube's active life characteristics and is governed by the cathode electronic emission. That is, as the tube deteriorates the electron flow from the cathode to the grid will diminish and cause the grid current to decrease. When the grid current has decreased to the predetermined setting of the relays the relays will no longer be held open. The dropping of the relay armature closes the circuit for the alarm or signaling device 51. The relay 50 also serves to indicate a defective condition in the tube such as a change in gas pressure from leakage which results in a change of the internal impedance of the tube; also in case the characteristics of the gas or mercury vapor have changed so as to increase the voltage drop in the tube.

The windings 50 also serve as a limiting resistance to prevent overloading of grid.

Figure 2:
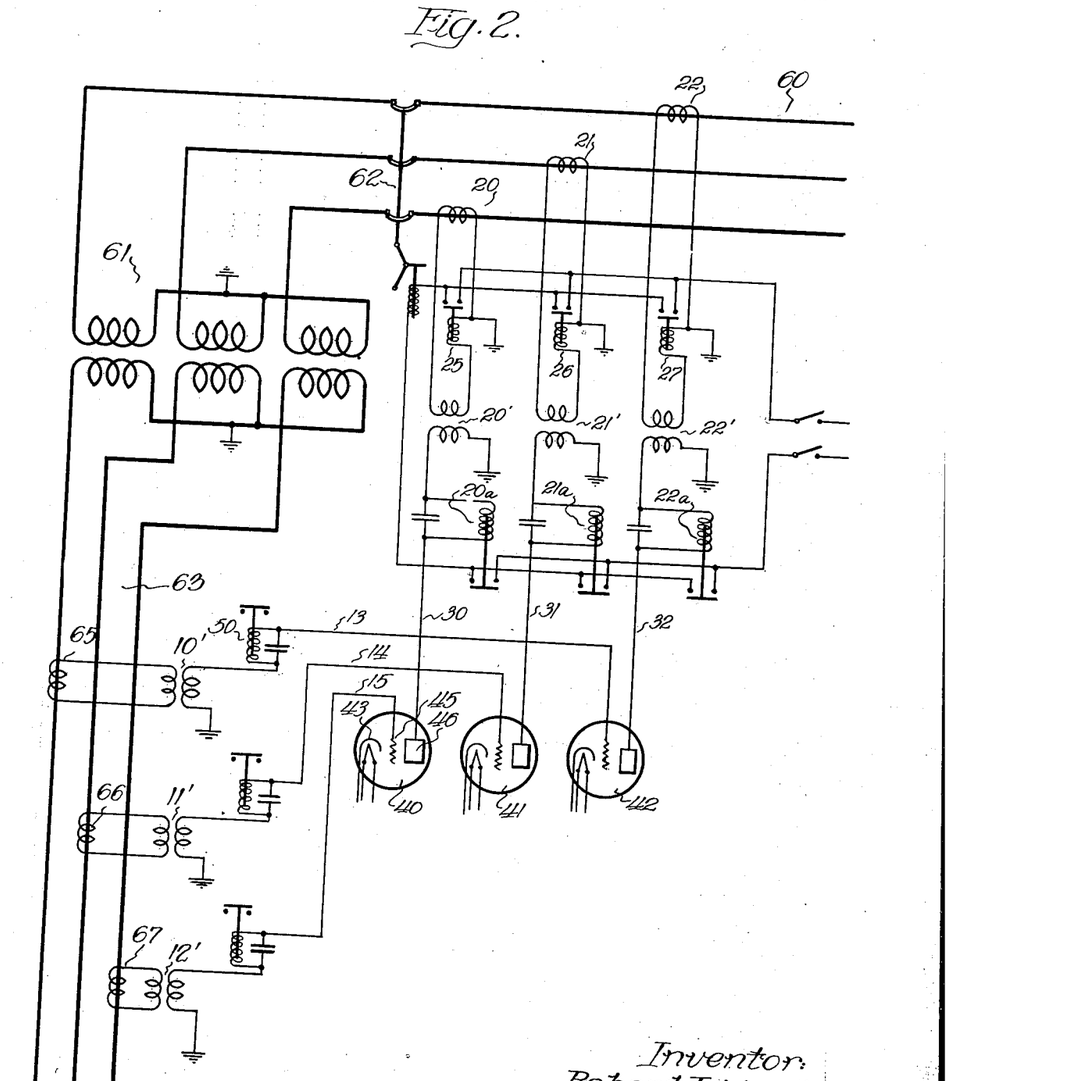
Figure 2 is a simplified circuit diagram illustrating my relay system applied for operation responsive to the occurrence of an internal fault in a transformer.

Reference may now be had to Figure 2 wherein I have shown my invention applied in a somewhat different manner from that illustrated in Figure 1. This arrangement affords protection for a transformer upon the occurrence of a fault therein. A power line 60 supplies power to the primary of a three phase transformer 61 through the usual switching connections including a circuit breaker 62. The secondary of the transformer supplies power to a feeder line 63. The plate circuit of this relay protective arrangement is identical to the plate circuit shown in Figure 1 and a further description thereof is therefore not necessary at this time. The grids, however, are supplied with voltage that varies as the current in the respective phase conductors on the secondary side of the transformer varies. For this purpose there are provided current transformers 65, 66, and 67, the secondaries of which are connected to the primaries of potential transformers 10', 11', and 12'. The secondaries of these transformers are connected to the grids of the respective tubes in the same manner as are the secondaries of the transformers 10, 11, and 12, of the system shown in Figure 1. The potential transformers 10', 11', and 12' may be of a construction substantially similar to that of the transformers 20', 21', and 22'. The rest of the system shown in Figure 2 is identical to that shown in Figure 1 and similar reference numerals have been used to indicate similar parts thereof.

Under normal operating conditions the grid and plate voltages are approximately 180 degrees out of phase hence no plate current flows. This system is not intended to afford protection against reverse power flow and will afford no such protection due to the fact that upon a reversal of power flow the relative phase relationship of the current on the primary side of the transformer 61 to that on the secondary side will remain substantially the same insofar as concerns the vacuum tube relays.

The apparatus is balanced so that under normal operating conditions the grid voltage and the plate voltage are 180 degrees out of phase. Should a fault develop in either the primary or secondary side of the transformer, that is, within the transformer itself, the phase relationship of the current on the two sides of the transformer will be disturbed. In addition the magnitude of the current on the primary side will be increased while the magnitude of the current on the secondary side will be decreased. As a result of this change in relative phase relationship and as a further result of the change in magnitude of the current, the grid will permit current to flow through the plate circuit during a portion of each cycle of the alternating current. The plate current controls the operation of the relays 20a, 21a, and 22a resulting in the energization of the tripping coil of the circuit breaker 62.

In the present instance I have shown the system as including time element overload relays 25, 26, and 27. These may be omitted if desired. They may be omitted as to both the time element and as to the overload element or if it is desired to retain the time delay element that renders operation of the circuit breaker independent of the overload, the relays 25, 26, and 27 are omitted and a time element is introduced into the operation of the relays 20a, 21a, and 22a.

Figure 3:
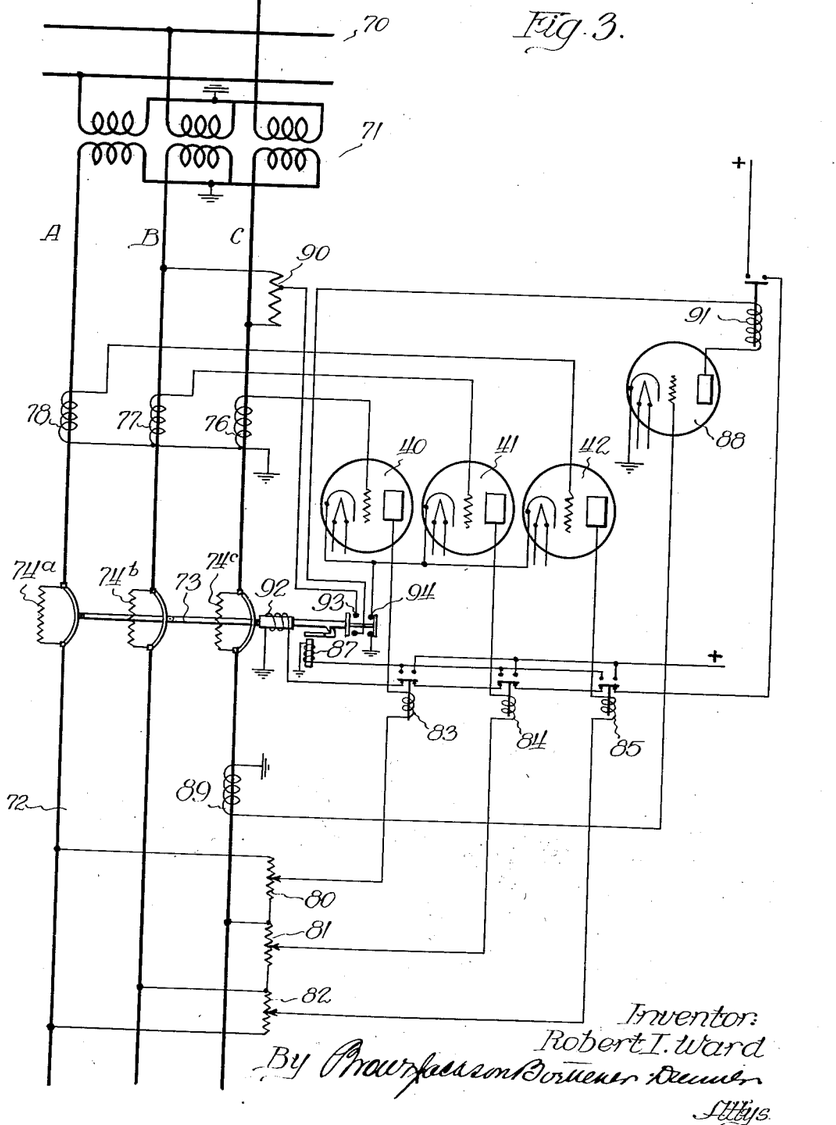
Figure 3 shows my invention as applied to a feeder circuit with an arrangement for automatically reclosing the circuit breaker upon the clearance of the faulty condition.

Reference may now be had more particularly to Figure 3 wherein I show an arrangement for opening a circuit breaker in an alternating current system responsive to a reversal of power flow and for reclosing the same automatically upon the correction of the conditions that brought about the reversal of power flow. A high voltage transmission line 70 supplies power through a step down transformer 71 to a line 72 which may be part of a network and which may also be connected at its other end to another source of power. A circuit breaker 73 is provided for disconnecting the section 72 from the high voltage line 70. Suitable resistors 74a, 74b, and 74c shunt the contact of the circuit breaker for permitting a limited flow of current when the circuit breaker is open. This flow of current is utilized for control purposes.

The reverse power vacuum tube relays used are of the same type as previously described and are indicated by the same reference numerals, said relays being provided with a cathode and means for heating the same, a plate, and a grid. The three grids of the three tubes are controlled by three current transformers indicated at 76, 77, and 78 whereas the plates are controlled by voltage impressed upon them by means of resistors 80, 81, and 82. The resistor 80 is connected between the A and C phases, the resistor 81 is connected between the B and C phases, and the resistor 82 is connected between the A and B phases. The plate connections are made at variable points on the three resistors. Relays 83, 84, and 85 are included in the plate circuits of the respective tubes.

The phase relationship of the grid and plate voltages under normal conditions is such that the grid prevents any substantial plate current flow. The two voltages are approximately 180 degrees out of phase. Should a fault develop in the distribution transformer 71 or in the high voltage feeder line 70 with the result that power tends to flow from the low voltage network 72 to the transformer 71 or to the line 70 there will be a resulting reversal in the instantaneous direction of current flow with respect to the voltage and therefore the grid and plate voltages will now be substantially in phase. This permits current to flow through the plate circuits and results in the operation of the relays 83, 84, and 85. At their front contact the relays establish a circuit for the tripping coil 87 of the circuit breaker 73. The circuit breaker trips out and by inserting the resistance 74a, 74b, and 74c it reduces the extent of reverse power flow to a negligible amount. The relays 83, 84, and 85 may now drop back. However, the position of these relays at this time is immaterial in that they produce no operating action in either position. It is desirable that they drop back because by so doing they open the circuit to the tripping coil 87 and prevent an unnecessary flow of current through this coil.

I provide an arrangement for reclosing the circuit breaker when the transformer voltage becomes greater than the network voltage and leads it in phase angle. This is accomplished by means of a fourth vacuum tube indicated at 88, and of a construction similar to that of the other tubes. The grid voltage on this tube is supplied by a current transformer 89 and the plate voltage is supplied by a resistor 90 connected across the B-C phases. The resistor 74c permits a limited flow of current through the C phase conductor when the circuit breaker is opened. When the direction of power flow is from the network to the transformer 71 the voltage on the grid of the tube 88, as supplied by the current transformer 89, is roughly 180 degrees out of phase with the plate voltage, hence no plate current flows. When the voltage of the line 70 becomes greater than the network voltage and leads it in phase angle, which is the condition necessary for a transfer of power from the line 70 to the network, the potential on the grid with respect to the plate will be reversed so that the grid voltage is substantially in phase with the plate voltage. Plate current will now flow through the plate circuit of the tube 88 thereby bringing about an energization of the relay 91. This relay at its front contacts completes a circuit through the back contacts of the three relays 83, 84, and 85 to the operating coil 92 of the circuit breaker 73. When the circuit breaker operates to close the circuit between the network and the transformer 71 it opens the plate circuit of the tube 88 at its contact 93.

It is to be noted that the contacts 93 of the circuit breaker 73 are open when the circuit breaker is closed and the contacts 94 are open when the circuit breaker is open. The circuit breaker is closed during the normal operation of the system hence the reverse power relays 40, 41, and 42 are normally operatively connected. At this time the plate circuits of the tube 88 is open hence the relay 91 is in its deenergized position. When the circuit breaker 73 has been tripped the relays 40, 41, and 42 are rendered inoperative by reason of the fact that the ground cathode circuit has been opened, hence the relays 83, 84, and 85 drop back. The dropping back of those relays merely conditions the system for reclosure upon the operation of the relay 91 under control of the tube 88. If desired the contact 94 may be replaced by three sets of contacts, one set in each of the plate circuits. Those contacts would be arranged to be closed when the circuit breaker is closed and open when the circuit breaker is open. Under those conditions the cathodes of the three tubes 40, 41, and 42 are permanently grounded. If desired the contacts 93 and 94 of the circuit breaker may be entirely omitted in which case the plate of the tube 88 is connected directly to the resistance 90 and the cathodes of all of the tubes are permanently grounded. Under such conditions when power is flowing from the network to the line 70 the grid and plate voltages on the tube 88 are out of phase and no current flows through the winding of the relay 91 hence the contacts of this relay are open. When the power is flowing in the proper direction and the circuit breaker is closed there will be no current flowing through the plate circuit of the directional relay tubes 40, 41, and 42 hence the relays 83, 84, and 85 are in their open position. The circuit to the operating coil 92 of the circuit breaker may remain closed, or if desired it may be opened by means of a set of back contacts on the circuit breaker mechanism. Upon a reversal of power flow the relays 83, 84 or 85 operate and open the initial operating circuit of the coil 92 and produce a tripping of the circuit breaker by closing the circuit for the tripping coil 87.

Figure 4:
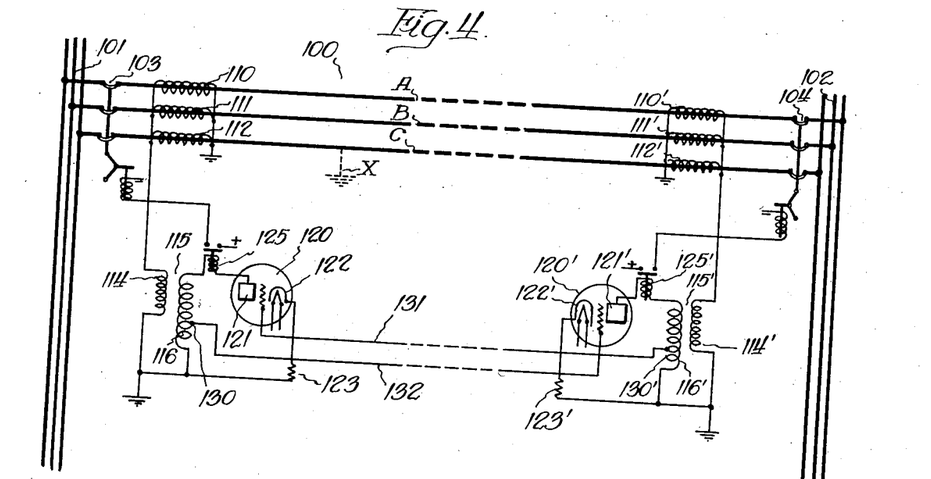
Figure 4 is a circuit diagram illustrating a pilot wire protecting arrangement embodying the principles of my invention.

Reference may now be had more particularly to Figure 4, wherein I have shown my invention applied to a section of a three phase power line for isolating the section upon the occurrence of a fault in the section. The section to which the protection is applied is indicated at 100 and forms a connecting link between two parts of the system indicated as a power line 101 and a power line 102. Circuit breakers 103 and 104 at the two ends of the section 100 connect this section with the rest of the system. The apparatus at the left-hand end of the section 100 comprises three current transformers 110, 111, and 112, one for each phase of the system. The secondaries of the three current transformers are connected in parallel with one another and in parallel with the primary 114 of a special pilot transformer 115. When the load carried by the three conductors of the section 100 is balanced, no current will flow through the primary 114 of the transformer 115. The secondary 116 of the transformer 115 is connected to supply voltage to the plate of a high vacuum tube 120 of a construction similar to that of the tubes previously described. The plate is indicated at 121. The cathode is indicated at 122, said cathode being grounded through a suitable resistance 123. A relay 125 is connected in the plate circuit, said relay controlling the tripping of the circuit breaker 103.

At the right hand end of the section 100 there is provided a set of apparatus similar to that at the left-hand end of the section. Similar reference numerals have been used to indicate similar parts of the two ends of the section, the reference numerals for the part at the right hand end of the section being primed. The secondary of the transformer 115 is provided with a tap 130 which supplies voltage to the grid of the tube 120'. A similar tap on the secondary of the transformer 115' supplies voltage to the grid of the tube 120. For this purpose two pilot wires 131 and 132 are provided.

Under normal operation when there is a balanced load upon the three conductors of the section 100 no current flows through the primaries of the transformers 115 and 115' hence there is no voltage upon the plate or the grid of the two tubes. The tripping relays 125 and 125' therefore remain unenergized. Under certain fault conditions a current does flow through the primaries 114 and 114', resulting in an operation of the relay system to isolate the section of the line.

An explanation will now be given of the operation of this system upon the occurrence of faults at various places in the system and under various conditions. Assume that a ground fault occurs on the C phase conductors at the point marked "X". Assume further that power is being fed to the fault from both the line 101 and the line 102. The unbalanced current in the current transformers 110, 111, and 112 will flow through the primary of the transformer 115 and will induce a voltage in the secondary thereof thus placing an alternating voltage upon the plate 121 of the tube 120 and, through the conductor 132, placing an alternating voltage upon the grid of the tube 120'. At the same time power is being fed to the fault from the line 102 thereby producing a similar condition in the apparatus at the righthand end of the section 100 whereby an alternating voltage is impressed upon the plate of the tube 120' and, through the pilot conductor 131, upon the grid of the tube 120. Since the lines 101 and 102 are interconnected as part of a network the voltages on these two lines will be in phase with one another, hence the currents through the primaries 114 and 114' will be in phase with one another. From this it follows that the voltage on the grid of the tube 120 as supplied by the secondary 116' of the transformer 115' will be substantially in phase with the voltage on the plate 121 as supplied by the secondary of the transformer 115. A similar phase relationship exists between the voltages on the grid and plate of the tube 120'. The grids will therefore permit current to flow through the respective plate circuits and bring about the energization of the relays 125 and 125' which, upon closing, complete the circuits for tripping the circuit breakers 103 and 104.

If power were being fed to the ground fault from only one end of the line the operation would be substantially the same as above set forth. Assume that the line 101 is the power line and the line 102 extends to a load and is not connected to any other source of power. Fault current feeding through the C phase conductor will result in a current flow through the primary of the transformer 115 in the same manner as has been previously set forth, with the result that alternating potential is applied to the plate of the tube 120 and to the grid of the tube 120'. If there is a load on the line 102 there will be a return current flow from the A and B phases through the load to the C phase, said return current resulting in unbalancing of the equilibrium of the current transformers at the righthand end of the section. This unbalanced current will flow through the primary of the transformer 115' and will result in the placing of an alternating potential upon the plate of the tube 120' and upon the grid of the tube 120 in the same manner as would have happened if power were supplied from the line 102 as previously set forth. Therefore the circuit breakers are tripped in the same manner as was previously described. If, at the time of occurrence of the fault at the point marked "X" there is no load upon the conductors 102, or if the equivalent results from the fact that the circuit breaker 104 happens to be open at the time, the operation of the system will not be adversely affected. Under such conditions there is an alternating voltage impressed upon the plate of the tube 120 and an alternating voltage impressed upon the grid of the tube 120. There is no voltage upon the grid of the tube 120 and there is no voltage upon the plate of the tube 120'. The tube 120' therefore does not produce an operation of the relay 125'. On the other hand plate current does flow through the plate circuit of the tube 120 notwithstanding the absence of the grid potential. This is due to the fact that the tube here used is a mercury vapor tube and it is not necessary to have a grid voltage in order to initiate current flow in the cathode-plate circuit. The grid is effective only to prevent the initiation of such current flow when the grid is at a negative potential. The relay 125 operates and brings about a tripping of the circuit breaker 101. Under such conditions it is to be noted that the circuit breaker 104, if it is not already open, need not be tripped since if there is no load upon the line 102 and it is not connected to a source of power, it is immaterial whether the circuit breaker 104 is open or closed.

It is to be noted that current will flow through the plate circuit of the hot cathode tubes when there is plate voltage and there is no impediment from the grid. Thus if the grid voltage is in phase with the plate voltage, there will be a plate current flow during each half cycle that the plate voltage is positive. The same condition will prevail when there is no voltage on the grid. However, if the grid and the plate are substantially 180 degrees out of phase, then the grid will prevent plate current flow. It is to be noted that the current transformers at the two ends of the section 100 are oppositely connected so that when the current is flowing in the same direction at the two ends of the section the unbalanced current, if any, in the primaries of the transformers 115—115' will be in opposite direction whereas if the directions of flow at the two ends of the section are in opposition, then the resulting current in the primaries of the transformer 115—115' will be in the same direction.

When a fault occurs externally of the section 100 but so related to the section 100 that the unbalanced fault current flows therethrough it is not necessary, nor desirable, to open the circuit breakers 103—104 since the fault, being external of the section under consideration, should be cleared by the protective apparatus provided at the fault, thus permitting as much of the system as possible to remain in service. To show that the circuit breakers 103 and 104 are not tripped under such circumstances let us assume that a ground fault occurs on one of the phase conductors of the line 102 and is supplied with power from the line 101 by way of the section 100. Assume that the fault is on the C phase conductor. An unbalanced current will flow through the section 100, the instantaneous direction of flow being the same at the two ends of the section. A large current will flow through the current transformer 112 to ground by way of the primary 114 and a similar current will flow through the transformer 112' to ground by way of the primary of the transformer 115'. It is to be noted that the secondaries of the two current transformers are oppositely connected with respect to the primaries of their associated pilot transformers 115—115'. Therefore the current flowing through the primaries of the transformers 115—115' will be approximately 180 degrees out of phase. Since each of the two tubes 120—121 is supplied with plate voltage from one of the pilot transformers and with grid voltage from the other pilot transformer it follows that the plate and grid voltages of the two tubes will be substantially 180 degrees out of phase and hence the grids will prevent the flow of current through the respective plate circuits. Therefore the relays 125 and 125' will not operate and the circuit breakers will not be tripped.

Figures 5, 6:
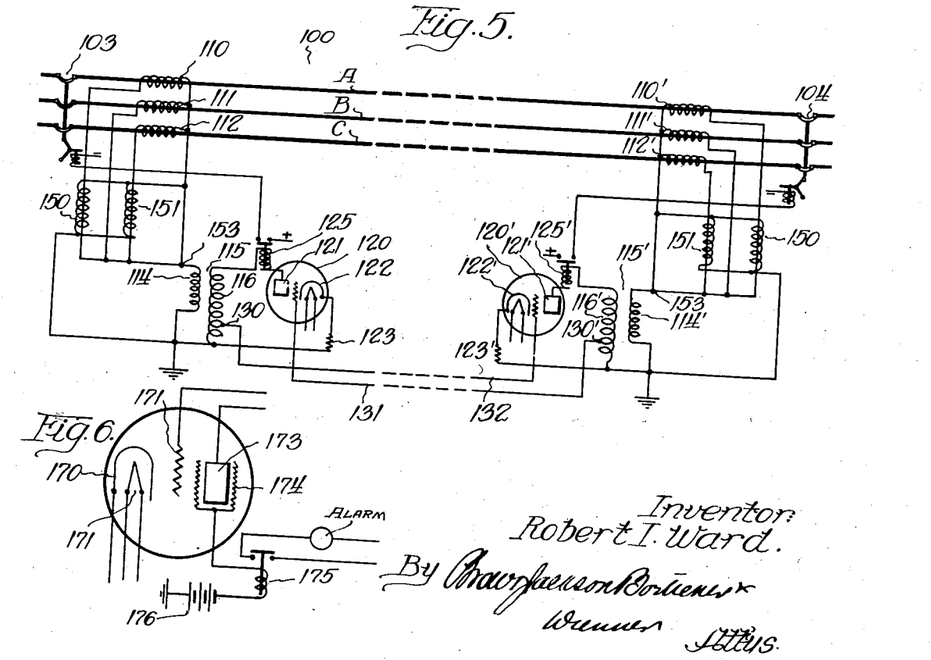
Figure 5 is a modification of the circuit shown in Figure 4; and—
Figure 6 is a diagram illustrating a modified form of hot cathode tube for use in the above circuits.

Reference may now be had to Figure 5 wherein I show my invention as applied to a somewhat different protective arrangement. The system shown in Figure 5 is identical to that shown in Figure 4 except for the fact that two additional current transformers 150 and 151 are provided at one end of the section and two current transformers 150 and 151 are provided at the other end of the section. The circuit shown in Figure 5 is adapted to be connected in a system such as is shown in Figure 4. The current transformer 150 is of a ratio different from that of the current transformer 151. By way of illustration, the transformer 150 may have a two-to-one ratio and the transformer 151 a four-to-one ratio. It may be shown that a voltage will be present between the point 153 and ground upon the occurrence of an overload upon any one, two, or all three of the conductors of the line 100 of Figure 5. This is true whether the overload is brought about by a phase to ground fault, a two phase fault, or a three phase fault, even though the three phase fault results in a balanced current flow over the three phase conductors of the line 100. A further description as to why this takes place is to be found in the patent to Titus G. LeClair and Charles M. Gross, No. 1,919,231, of July 25, 1933. This voltage will induce a current flow through the primary of the transformer 115 with the result that a voltage will be induced in the secondary of this transformer. A similar action takes place at the other end of the section 100. The action of the two hot cathode tubes in the system shown in Figure 5 will be identical to that of the tubes in the system shown in Figure 4. When the voltages on the secondaries of the transformers 115 and 115' are in phase the grids of the respective tubes will permit a current flow whereas when the voltages are 180 degrees out of phase the grids will prevent a plate current flow. It is to be noted that when the overload current is in the same direction at the two ends of the section 100, indicating that the fault is external of the section, the voltages of the secondaries of the transformers 115—115' will be in opposition, whereby no current flows through the plate circuit, whereas when the currents flow in the same relative directions at the two ends of the line, indicating a fault between the two ends of the line, the voltages at the secondaries of the transformers 115—115' will be in phase whereby the grids permit a plate current flow.

In Figure 6 I have shown, in diagrammatic form, a high vacuum tube having a relay connected in the screen grid circuit for giving an indication of the deterioration of the tube. The cathode is shown at 170, the heater therefor at 171, the grid at 172, the plate at 173, and the screen grid 174. The grid and the plate are adapted to be connected in circuit in the same manner as are the grids and the plates of the tubes in the systems previously described. A relay 175 and a battery 176 are connected in series with one another between the screen grid and ground. As long as the tube is in operating condition there will be a small current flow through the winding of the relay 175 whereby this relay maintains its contact open. Should the current cease to flow through the winding 175 the relay will fall back, closing its contacts, and completing a circuit for an alarm.

In compliance with the requirements of the present statutes I have herein shown and described various arrangements embodying the principles of my invention. It is, however, to be understood that the invention is not limited to the precise embodiment herein shown, the same being merely illustrative of the invention. What I consider new and desire to secure by Letters Patent is:

I claim:

1. In an alternating current electric system having two alternating voltages of the same frequency and subject to relative phase change, means responsive to a predetermined reversal of energy flow in said system comprising a directional control tube having a plate and a grid, means for impressing one of said alternating voltages on the plate and the other on the grid and maintaining the phase relation between the plate voltage and the grid voltage substantially as a function of the phase relationship of said first-mentioned voltages, circuit interrupting means responsive to predetermined flow of plate current, a saturating current transformer in the plate circuit of said tube responsive to variations in line current for maintaining the current in said plate circuit below a value sufficient to cause operation of said interrupting means under overload conditions in the normal direction of current flow, said tube having a separately energized constant cathode heating surface and maintaining control of said plate current throughout all relative phase angles of said alternating voltages.

2. In an alternating current system, means for detecting a phase displacement of the current at one portion of a line with respect to one of the sinusoidal variables at a point in the system, said means comprising a tube having a plate element, a grid element, and a separately energized constant cathode heating circuit, means for impressing on one of the elements an alternating voltage having a fixed phase relation to the current, means for impressing on the other element an alternating voltage having a fixed phase relation to the other sinusoidal variable, whereby the plate current varies as a function of the phase displacement of the two, said tube retaining control of said plate current throughout all variations in relative phase angle between said alternating voltages, and electro responsive means controlled by the plate current, said plate and grid voltages being normally substantially in phase opposition whereby the grid opposes plate current flow, and means in the circuit of said plate element for increasing the plate voltage when the grid voltage drops to maintain the plate current through said tube substantially constant during overload, said grid permitting an effective plate current flow upon a predetermined phase displacement between the plate and grid voltages.

3. In combination with an alternating current system, a power directional relay comprising a tube having a plate member and a grid member, means impressing on one of said members an alternating voltage which is at a predetermined phase angle to the system voltage, and means impressing a voltage on the other member which is at a predetermined phase angle to the current in a portion of the system including a saturating transformer operating above the knee of the iron saturation curve at currents above a predetermined line current value, said two last mentioned voltages being substantially in phase with one another when the power flows in one direction, thereby permitting a plate current to flow, and substantially always in opposition when the power flows in the other direction whereby the grid substantially prevents plate current flow.

4. In an alternating current system, a power supply circuit, a power receiving circuit connected thereto by means including a circuit breaker, means for closing the circuit breaker when the voltage on the supply circuit equals or exceeds the voltage on the other circuit and is displaced from it in phase angle, said last named means comprising a tube having a plate and a grid, means for impressing on the grid and on the plate alternating voltages having a certain relative phase relationship when the conditions for closure of the circuit breaker exists and having a different phase relationship when the conditions for closure of the circuit breaker do not exist, the plate current being controlled by the phase relationship of the grid and plate voltages, compensating means responsive to variations in grid voltages for maintaining the plate current through said tube below a predetermined operative value to prevent operation of said circuit-closing means under overload, and means controlled by the plate current for closing the circuit breaker.

5. In an alternating current system, a line, a circuit breaker in the line, current responsive means connected to the line on one side of the breaker, voltage responsive means connected to the line on the opposite side of the breaker, means for maintaining both of said responsive means energized when the breaker is open, a tube having a plate circuit and a grid circuit, means controlling one of the circuits in accordance with the line current and the other in accordance with the line voltage, the voltages on the plate and on the grid being substantially in phase opposition when power is flowing through the line in the proper direction, whereby the grid prevents substantial plate current flow, a saturating transformer in the controlling means for said plate circuit for maintaining the voltage impressed on said plate circuit substantially constant upon increase in line current above a predetermined value, the grid and plate voltages being substantially in phase when the direction of power flow is reversed, whereby the grid assists the establishment of a plate circuit, and circuit breaker tripping means controlled by the plate circuit, said tube retaining control of said plate current throughout all relative phase angles of said alternating voltages.

6. In combination, an alternating current line, a circuit breaker in the line, means for tripping the breaker responsive to a reversal in the direction of power flow in the line, current limiting means shunting the breaker, a tube having a plate circuit and a grid circuit, means for impressing on one of said circuits a voltage having substantially fixed phase relation to the line voltage and on the other circuit a voltage having a substantially fixed phase relation to the current flowing through the current limiting means, said tube maintaining control of said plate current in the plate circuit throughout all relative phase angles of said line voltages, and means controlled by said tube for reclosing the circuit breaker when the phase angle between the two last mentioned voltages indicates a proper direction of flow of power through the current limiting means, and compensating means in said plate circuit for preventing increase of impressed voltage on said plate circuit when said line is subject to an overload current to maintain a predetermined relation between said plate and grid circuits above a predetermined line current.

7. In combination, a line, a circuit breaker in said line, means in said line on one side of said breaker responsive to energy flow in said line, means in said line on the other side of said breaker responsive to energy flow in said line, a tube having a grid circuit and a plate circuit respectively connected to said energy flow responsive means, the voltages of said circuit being normally in a predetermined phase relationship preventing operative plate current flow through said plate during normal operation of said line, said tube being of the type normally permitting a grid current flow irrespective of the plate voltage, and means responsive to line current above a predetermined value for maintaining the plate voltage of said tube substantially constant above said value whereby upon an abnormal condition being imposed upon the line said grid and plate voltages are moved into a phase relationship providing for operative current flow through said plate circuit, and means responsive to said operative plate circuit current flow for tripping said circuit breaker.

8. In combination, a line, a circuit breaker in the line, a power directional element for tripping the breaker upon the reversal of power flow comprising a directional control tube having a grid circuit and a plate circuit, means in said plate circuit for controlling the plate voltage to prevent increase of plate voltage beyond a predetermined value when the line current reaches a predetermined maximum overload, whereby said breaker will not operate under overload conditions, and a second power directional element comprising a high vacuum tube having a constantly energized cathode heating circuit and having a grid circuit and a plate circuit for reclosing the circuit breaker responsive to the reestablishment of conditions required for the flow of power in the right direction, said tube retaining control of the plate current throughout all relative phase changes of power flow.

9. In combination, an alternating current line, a circuit breaker in said line having a trip circuit, a tube having a plate circuit and a grid circuit, a current transformer in said line at one side of said breaker for impressing an alternating current voltage on said plate circuit, a voltage transformer in said line on the other side of said breaker for impressing an alternating current voltage on said grid circuit, the voltages of said circuits of said tube being normally in a predetermined phase relationship preventing operative plate current flow to said plate circuit during normal operation of said line, a saturating transformer in said plate circuit operating above predetermined values of line current in normal direction of current flow to maintain the voltage on said plate circuit in a predetermined relation to the grid voltage and for preventing operative plate current flow during overload on said line, whereby upon reversal of power flow through said line said phase relationship of said voltages is shifted to allow operative plate current flow for energizing said trip circuit.

10. In an alternating current line, a directional control tube having a plate circuit and a grid circuit, means responsive to the voltage in said line for impressing an alternating current voltage on said grid circuit, means responsive to the current in said line for impressing an alternating current on said plate circuit, said voltage normally being maintained in predetermined phase relationship to prevent operative plate current flow, a circuit breaker in said line operated by predetermined operative plate current flow, and means in said plate circuit for maintaining said impressed plate voltage substantially constant as the line current increases above normal in the normal direction of line current flow to prevent operative plate current flow upon overload, said means being inoperative to prevent operative plate current flow for operating said circuit breaker when the line current reaches a predetermined value in the reverse direction of flow.

ROBERT I. WARD.